US010627323B2

(12) United States Patent
Vecere

(10) Patent No.: US 10,627,323 B2
(45) Date of Patent: Apr. 21, 2020

(54) LOW PERMEABILITY SAMPLE BAG

(71) Applicant: William T. Vecere, Royal Oak, MI (US)

(72) Inventor: William T. Vecere, Royal Oak, MI (US)

(*) Notice: Subject to any disclaimer, the term of this patent is extended or adjusted under 35 U.S.C. 154(b) by 175 days.

(21) Appl. No.: 15/173,000

(22) Filed: Jun. 3, 2016

(65) Prior Publication Data

US 2016/0356678 A1 Dec. 8, 2016

Related U.S. Application Data

(60) Provisional application No. 62/171,289, filed on Jun. 5, 2015.

(51) Int. Cl.
*G01N 1/22* (2006.01)
(52) U.S. Cl.
CPC .................. *G01N 1/2252* (2013.01)
(58) Field of Classification Search
CPC ......... G01N 1/2252; G01N 2001/2255; G01N 1/22; G01N 1/2273; G01N 2001/2279; G01N 1/10
USPC ...... 73/864, 864.34, 864.35, 864.51, 864.62, 73/864.73, 864.74
See application file for complete search history.

(56) References Cited

U.S. PATENT DOCUMENTS

| | | | |
|---|---|---|---|
| 3,438,263 A * | 4/1969 | Cohen | G01N 1/10 73/863.86 |
| 4,544,721 A | 10/1985 | Levy | |
| 5,074,155 A | 12/1991 | Vecere | |
| 5,178,021 A * | 1/1993 | Kosuth | B65D 75/5877 222/105 |
| 5,218,874 A | 6/1993 | Vecere | |
| 5,239,877 A | 8/1993 | Suddath et al. | |
| 5,438,884 A | 8/1995 | Suddath | |
| 5,456,126 A | 10/1995 | Suddath | |
| 5,522,272 A | 6/1996 | Vecere et al. | |
| 5,898,113 A | 4/1999 | Vecere | |
| 7,803,890 B2 | 9/2010 | Samuels et al. | |
| 8,063,149 B2 | 11/2011 | Samuels et al. | |

(Continued)

FOREIGN PATENT DOCUMENTS

| | | |
|---|---|---|
| CN | 200979515 Y | 11/2007 |
| CN | 102883968 A | 1/2013 |

(Continued)

OTHER PUBLICATIONS

Supplementary European Search Report in corresponding application EP16804579.7 dated Apr. 4, 2019, 8 pgs.

(Continued)

*Primary Examiner* — Robert R Raevis
(74) *Attorney, Agent, or Firm* — Young Basile Hanlon & MacFarlane, P. C.

(57) ABSTRACT

A fluid sample bag is composed of a first sheet and a second sheet of flexible polymeric material. Each sheet has an outer peripheral region, an inwardly oriented face and an outwardly oriented face. A continuous seam is located in the outer peripheral regions of the respective first and second sheets of flexible polymeric material, contiguously interposed between the first and second sheets and composed of melted polymeric material derived from the first and second sheets. The fluid sample bag has a gas permeability less than 10 ppm.

11 Claims, 6 Drawing Sheets

(56) References Cited

U.S. PATENT DOCUMENTS

| | | |
|---|---|---|
| 2003/0008152 A1 | 1/2003 | Tsai et al. |
| 2003/0204018 A1 | 10/2003 | Granel et al. |
| 2005/0132821 A1* | 6/2005 | Furey .................. G01N 1/10 73/863.31 |
| 2006/0246546 A1 | 11/2006 | Jenkins et al. |
| 2007/0269350 A1* | 11/2007 | Coyne .................. B01L 3/505 422/400 |
| 2008/0153978 A1 | 6/2008 | Samuels et al. |
| 2011/0219891 A1 | 9/2011 | Mihaylov et al. |
| 2012/0184697 A1 | 7/2012 | Samuels et al. |
| 2013/0180345 A1 | 7/2013 | Mihaylov et al. |
| 2014/0154370 A1 | 6/2014 | Wood et al. |
| 2014/0339167 A1 | 11/2014 | Lu et al. |
| 2015/0216465 A1* | 8/2015 | Akiyama ............ A61M 1/0218 73/863.81 |
| 2016/0042837 A1 | 2/2016 | Ranganathan et al. |

FOREIGN PATENT DOCUMENTS

| | | |
|---|---|---|
| CN | 103447102 A | 12/2013 |
| EP | 1 234 521 A2 | 8/2002 |
| JP | S52-114783 U | 8/1977 |
| JP | 2008-538929 A | 11/2008 |

OTHER PUBLICATIONS

Chinese First Office Action in corresponding Chinese Patent Application No. 201680039453.2, dated Nov. 18, 2019, and its English translation, 19 pgs.

Yuanqing Xie, "Characteristics and Processing of Engineering Plastics," 1st edition, World Publishing Corporation, Mar. 1990, Sections 4.15 and 4.16, pp. 198-207, and a partial English translation, 10 pgs.

Office Action in corresponding Japanese patent application JP2018-515196, dated Jan. 21, 2020, and its machine-anguage English translation, 10 pgs.

* cited by examiner

LOW PERMEABILITY SAMPLE BAG

CROSS-REFERENCE TO RELATED APPLICATION(S)

This application claims priority to U.S. Provisional Application No. 62/171,289 filed Jun. 5, 2015, the contents of which is incorporated by reference herein.

TECHNICAL FIELD

This disclosure relates to ambient air sampling containers. Furthermore, this disclosure relates to gas emission sample containers for collecting gas emissions from motor vehicles.

BACKGROUND

Expandable, sealed containers or bags are employed for collecting and temporarily storing gas emissions from motor vehicles before the collected emissions are analyzed by suitable test equipment. Such containers are expandable to a predetermined volume to collect a known quantity of gaseous emissions.

Typically, a plurality of such containers, such as six containers, are connected through suitable conduits, valves, etc., to a test apparatus to collect separate quantities of gas emissions from a vehicle and from ambient atmosphere. Samples of emissions from a motor vehicle under test are collected in the sealed containers as the motor vehicle is operated according to a prescribed test schedule corresponding to various engine operating conditions.

The expandable containers include a fitting sealingly mounted in each container which is connected to the test apparatus to receive gas emissions from the vehicle under test. The fitting directs the gas emissions into the container for storage, as well as enabling the stored gas contents to be evacuated from the container for subsequent analysis. The fitting and the sealed container are made of a chemically inert material, such as a fluorinated carbon plastic, i.e., plastics sold under the registered trademarks TEFLON, KYNAR, and/or TEDLAR.

In order to prevent wrinkling of the container when it is evacuated of gas and to insure complete inflation of the container to a constant volume without internal dead spots, small diameter, hollow conduits or tubes are disposed within the sealed container and connected in fluid flow communication with the fitting. The conduits have apertures formed along their lengths to draw gas from different parts of the container to prevent stratification of the gas within the container and to insure thorough mixing of the gas. Such conduits have been provided in a variety of shapes, such as a plurality of circumferentially spaced, straight segments, curved segments, etc.

An example of a fitting and gas conduit arrangement suitable for use in a gas emission sample apparatus is disclosed in U.S. Pat. No. 5,074,155. The fitting disclosed in this application has a small, smoothly tapered shape which minimizes dead spots in the container in the area of the fitting. Further, gas flow ports are formed in the fitting and receive gas conduits such that the gas conduits are arranged in a predetermined shape within the container to insure complete filling of the container to a constant volume and the complete evacuation of the stored gas from the container.

However, small gas emission containers for small sample volumes do not have sufficient interior space to enable the use of a gas flow conduit or conduits therein. Further, the economics of such small sample containers dictate away from the use of gas flow conduits and the associated, more complex fittings. However, such small gas emission containers must still be filled to a constant volume and, also, be completely evacuated of the gas contents for accurate test results. During storage and, particularly, during evacuation of the gas from the container, it is also important that the gas be distributed equally to all parts of the container and withdrawn from all parts of the container to overcome any stratification of the gaseous components that may occur.

It has also been found that while various fluoropolymeric sheet materials are inert, non-reactive and theoretically impervious to gas transmission. Gas permeability in sample bags composed of fluoropolymeric material such as TEFLON (polytetrafluorethylene), TEDLAR (polyvinyl fluoride), KYNAR (polyvinylidine fluoride) or HALON (polychlorotrifluoroethylene) has been greater than desired. In certain instances, it is believed that this is due to inadequate bonding characteristics between polymeric sheets composed of one or more of these polymeric materials. This has necessitated use of bonding agents, and multilayer materials in an attempt to achieve a robust flexible continuous seam between the respective fluoropolymeric sheets that are joined to produce an effective gas emission container. Heretofore such multilayer fluoropolymeric materials and bond regions did not provide the flexible, robust gas emission container in all situations.

SUMMARY

It would be desirable to provide a container for a gas emission sample apparatus which overcomes the problems associated with previously devised containers insofar as enabling complete filling of the container to a predetermined volume and complete evacuation of the container without the necessity of mounting a gas flow conduit internally within the container. It would also be desirable to provide a gas emission sample bag that can provide for ultra-low gas permeability. It would also be desirable to provide a container for a gas emission sample apparatus which can be simply constructed at a low manufacturing cost. It would also be desirable to provide a gas emission sample container with an internal mixing fitting which provides complete mixing of the gas stored in the container during storage and/or evacuation.

Disclosed herein is a fluid sample bag that is composed of a first sheet of flexible polymeric material, and a second sheet of polymeric material. The polymeric material employed has a transverse direction and a machined direction. The first sheet and the second sheet each have an outer peripheral region, an inwardly oriented face and an outwardly oriented face. A continuous seam is located in the outer peripheral regions of the respective first and second sheets of flexible polymeric material. The continuous seam is contiguously interposed between the inwardly oriented face of the first sheet of flexible polymeric material and the inwardly oriented face of the second sheet of polymeric material and composed of melted polymeric material derived from the first and second sheets. The first sheet, the second sheet and the continuous seam define a hollow expandable interior sealed chamber between the respective inwardly oriented faces of the first and second sheets and the fluid sample bag has a gas permeability less than 10 ppm.

Also disclosed herein is a stand-alone gas emission sample container for receiving, storing and discharging a constant volume of gas emissions. The stand-alone gas emission sample container includes a first sheet of flexible polymeric material and a second sheet of polymeric material. The polymeric material has a transverse direction and a machined direction. The first and second sheets each have an outer peripheral region and an inwardly oriented face and an outwardly oriented face. The first and second sheets are joined by a continuous seam located in the respective outer peripheral regions. The continuous seam is contiguously interposed between the inwardly oriented face of the first sheet of flexible polymeric material and the inwardly oriented face of the second sheet of polymeric material and composed of melted polymeric material derived from the first and second sheets. The stand-alone gas emission sample container also has a suitable fitting mechanism that extends through an aperture defined in in either the first or second sheet. The first sheet, second sheet, continuous seam and fitting define a hollow expandable interior sealed chamber between the respective inwardly oriented faces of the first and second sheets and the fluid sample bag has a gas permeability less than 10 ppm.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed is herein is a fluid sample bag such as a gas emission sample container that can be employed in sampling techniques and devices including automobile emission testing as well as being used in collection of various fluid samples such as gas and possibly certain liquids.

Figure 1:
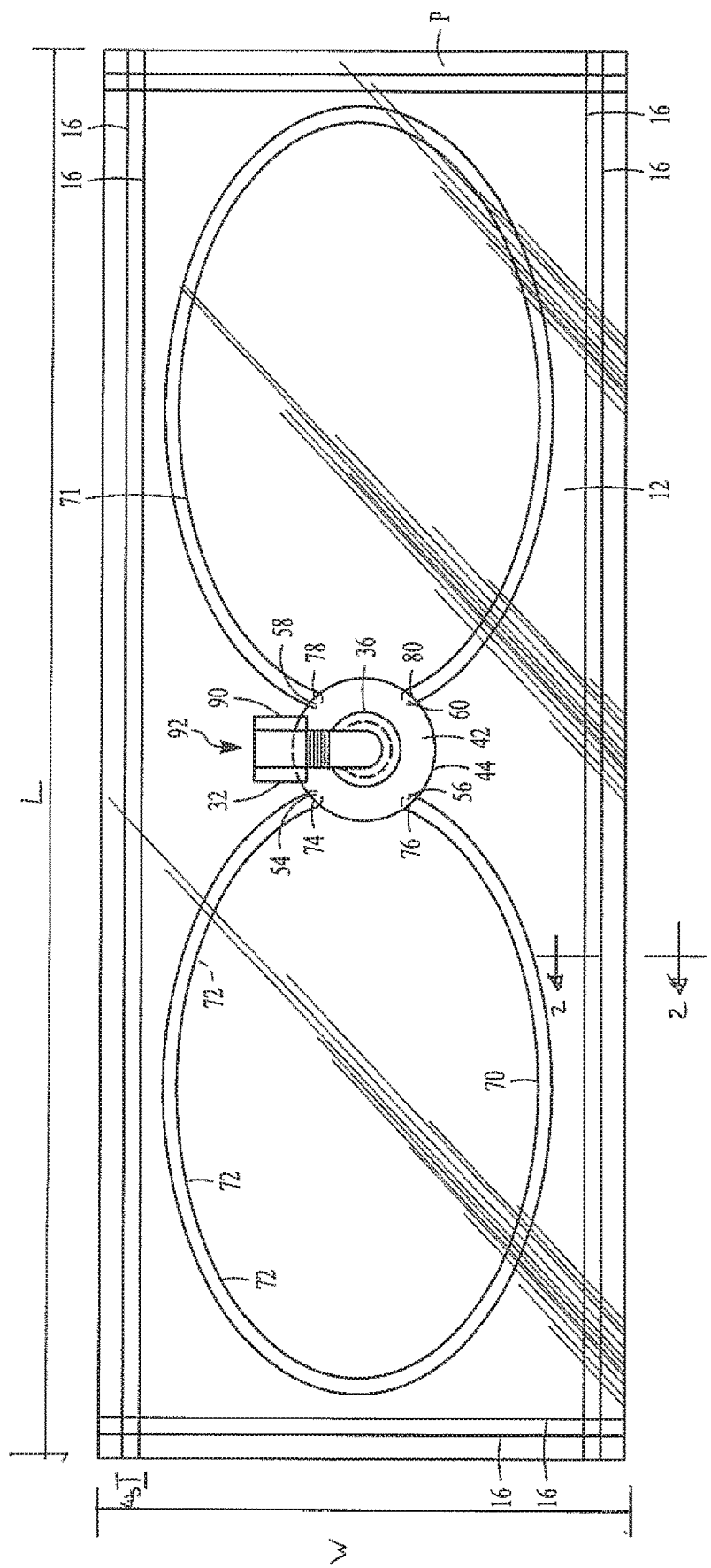
FIG. 1 is a plan view of a fitting and tube apparatus of the present invention mounted in an embodiment of stand-alone sealed gas emission sample container as disclosed herein.

Referring now to the drawing figures, and to FIG. 1 in particular, there is illustrated a sample bag such as gas emission sample container 10. The gas emission sample container 10 is connectible to suitable test equipment, not shown, to collect and temporarily store gas emissions from a motor vehicle or from ambient atmosphere prior to the evacuation of such stored gas emissions for subsequent analysis.

Figure 2:
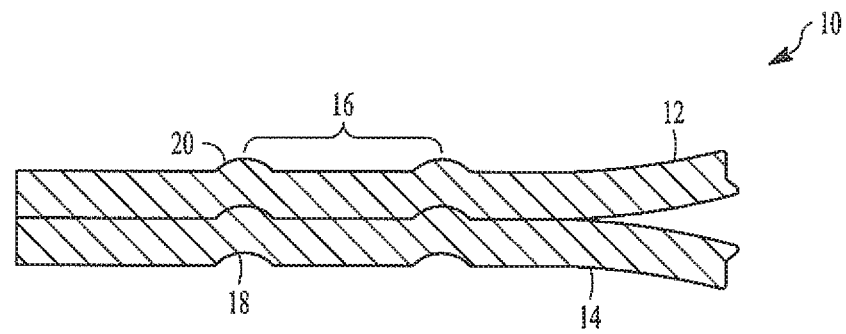
FIG. 2 is a cross sectional view generally taken along line 2-2 in FIG. 1.

As shown in FIGS. 1 and 2, the gas emission sample container 10 includes a sealed enclosure of any shape, such as rectangular, square, circular, etc. It will be understood that a rectangular shape for the container 10 having a length L and a width W is illustrated by way of example only. Further, the container 10 may be provided in different sizes depending upon the requirements of a particular test application. Sizes can range from gas emission sample containers having dimensions as small as 6 inches by 6 inches ranging to sample containers having dimensions of 4 feet by 6 feet.

The sealed container or bag 10, in one aspect, is formed of two flexible sheets of heat seamable polymeric material such as a fluoropolymeric material in which the two flexible sheets are in direct contact with one another. Heretofore, when fluoropolymeric materials such as TEFLON, TEDLAR KYNAR or HALON have been used in a sealed container or bag, effective bonding between the two layers necessitated that the fluoropolymeric film materials such as polytetrafluoroethylene, polyvinyl fluoride, or polychlorotrifluoroethylene be interposed with suitable intermediate adhesive materials because the aforementioned fluoropolymeric films did not provide an effective surface-to-surface heat seal. Even with the various adhesive materials employed, it is difficult to obtain and maintain an effective and robust heat seam and associated gas emission sample bag.

It has been unexpectedly discovered that certain fluoropolymeric films can be employed that can provide a sealed container or bag such as a fluid sample bag that exhibits a gas permeability less than 10 ppm, with a permeability less than 2 ppm in certain embodiments. It is contemplated that in certain embodiments the sealed container will have a gas permeability of less than 1 ppm, with gas permeabilities less than 0.5 ppm being possible in certain applications.

In some variations, the heat seamable plastic sheet can include a copolymer of chlorotrifluoroethylene and 1,1-difluoroethene. In some variations, such heat seamable plastics will have a melting point lower than 190° C., and in some variations will have a melting point within a range of 165 to 175° C., as measurable for example by differential scanning calorimetry (DSC). In some variations, such heat seamable plastic of choice will have a glass transition within a range of 50 to 60° C., also as measurable by DSC. An example of such suitable heat seamable fluoro-copolymer plastic is a material sold by Honeywell under the trade name ACLAR. Without being bound to any theory, it is believed that ACLAR materials may be a semi-crystalline copolymer of chlorotrifluoroethylene which contains up to 5% by weight of units of an ethylenically unsaturated copolymerizable organic monomer selected from the class consisting of alpha-olefins, fluorinated alpha-olefins and fluorinated ethers.

Other suitable fluoropolymeric materials that can be employed in various embodiments include at least one of the following copolymers: a copolymer having from about 0.1 wt % to about 50 wt % vinylidine fluoride and from about 50 wt % to about 99.9 wt % of a fluorinated comonomer; a fluorocarbon copolymer of 40 to 60 mole percent ethylene copolymerized with tetrafluoroethylene, chlorotrifluoroethylene, or semi-crystalline poly(chlorotrifluoroethylene); or a semi-crystalline copolymer of chlorotrifluoroethylene which contains up to 5% by weight of units of an ethylenically unsaturated copolymerizable organic monomer selected from the class consisting of alpha-olefins, fluorinated alpha-olefins and fluorinated ethers.

In certain embodiments, it is believed that the fluorinated material is a comonomer present in the fluoropolymeric copolymer in an amount from about 70 wt % to about 95 wt % of the copolymer and the vinylidine fluoride is present between about 5 wt % to about 30 wt % of the copolymer. The fluorinated comonomer is selected from the group consisting of: 2,3,3,3-tetrafluoropropene, 1,1,3,3,3-pentafluoropropene, 2-chloro-pentafluoropropene, hexafluoropropylene, trifluoroethylene, chlorotrifluoroethylene, 3,3,3-trifluoro-2-trifluoromethylpropene and a mixture thereof. Without being bound to any theory, it is believed that the materials may be commercially available from Honeywell under the trade designation PFX14-13.

Suitable fluoropolymeric materials can be fluoropolymers such as those outlined that have a specific gravity between 1.9 and 2.2, a modulus secant (transverse direction) between 1000 MPa and 1400 MPa and a vapor transmission rate less than 0.4 gms/m$^2$/day. It is believed that materials such as PFX14-13 is a monolayer fluoropolymeric film that can have the properties outlined in Table I when measured at 73° F. and 50% relative humidity when tested as a 3.0 mil film.

TABLE I

Properties of PFX14-04 - 3.0 mil film

| Properties | Typical Value English | Typical Value Metric | Test method |
|---|---|---|---|
| Specific Gravity | 2.08 | 2.08 | ASTM D1505 |
| Dimensional Stability 10 mins. @300° F./149° C. | MD <+10% TD <−10% | | ASTM D1204 |
| Tensile Strength | MD 8,700 psi TD 6,000 psi | 60 MPa 41 MPa | ASTM D882 |
| Elongation | MD 150% TD 250% | | ASTM D882 |
| Modulus, secant | MD 180,000 psi TD 170,000 psi | 1241 MPa 1165 MPa | ASTM D882 |
| Water Vapor Transmission Rate @100° F. (37.8° C.)/100% RH | 0.016 gms/100 in$^2$/day | 0.248 gms/m$^2$/day | ASTM F1249 |

The device disclosed herein can be described as a fluid sample bag that is composed of a first sheet 12 of polymeric material. The first sheet 12 has an outer peripheral region P. The device also includes second sheet 14 of polymeric material also having an outer peripheral region P. The device 10 also includes a continuous seam 16 located in the respective peripheral regions P that join the first and second flexible sheets 12, 14. The first and second flexible sheets 12, 14 each have an outwardly oriented face 11, 15 and an inwardly oriented face 17, 19 so oriented when the flexible sheets 12, 14 are positioned in overlying relationship relative to one another. The continuous seam 16 is contiguously interposed between the inwardly oriented face 17 of the first sheet 12 of flexible polymeric material and the inwardly oriented face 19 of the second sheet 14 of polymeric material and is composed heat processed polymeric material that is derived from the first and second sheets 12, 14.

The fluid sample bag 10 can also include an outer selvage 21 located in the outer perimeter region P exterior to the continuous seam 16 in the respective first and second sheets 12,14. Collectively, first sheet, the second sheet 12, 14 and the continuous seam 16 define a hollow expandable interior sealed chamber 22 between the respective inwardly oriented faces 17, 19 of the first and second sheets 12, 14.

The resulting fluid sample bag 10 has a gas permeability less than 10 ppm. In certain embodiments, it is contemplated that the fluid sample bag has a gas permeability of less than 5 ppm and in some embodiments, less than 0.5 ppm.

As depicted in one aspect as shown in FIG. 2, the sealed container 10 is formed of an upper of first sheet 12 and a lower, bottom or second sheet 14 of a single thickness or ply. Typically, the single ply sheets 12 and 14 are 2 or 4 mils. in thickness. However, thicknesses between 1 and 4 mils per sheet can be employed in certain circumstances. The first (upper) and second (bottom) sheets 12 and 14, respectively, are sealingly connected in their peripheral edge regions P by any suitable means, such as by the depicted heat seam 16. The continuous heat seam 16 can have a surface thickness $T_S$ sufficient to maintain the first and second sheets 12, 14 in bonded relationship with one another. In various embodiments the surface thickness $T_S$ of the continuous seam 16 is between 2 mils and 1000 mils. For additional sealing capability, two spaced heat seams 16 may be employed about the peripheral edges 21 of the upper and bottom sheets 12 and 14. The contiguous seam 16 can have a seam width $W_s$ in certain embodiments. Where desired or required, the seam width $W_s$ can have a value that is between 0.001% and 1% of the value of sample bag width W.

The heat seaming method employed, in one aspect, can form at least one recess 18 on one side of the joined sheets 12 and 14 and a small projection or bump 20 on the opposite surface as illustrated in FIG. 2. The heat seam or seams 16 seal the peripheral edges of the upper and bottom sheets 12 and 14 and form a hollow, expandable cavity 22 that can be seen in FIG. 6, within the interior of the sealed container 10.

The term "continuous", as it is used herein in relation to the seam 16 is defined to be a seam that extends around the peripheral region P of the associated first and second associated flexible sheets 12, 14 to provide a sealed member region between the first flexible sheet 12 and the second flexible sheet 12 and define the chamber 22. It is to be understood that the seam 16 can be composed of a plurality of individual elongated seam strips that extend from one selvage end of the assembly to another and are positioned to intersect with one another to form the chamber 22.

In certain aspects, the continuous seam 16 can be produced by suitable heat seaming methods as those produced by direct contact thermal sealing machines such as a hot bar sealers or impulse bar sealers. In certain processing applications, the direct contact sealer will be configured with a single heater bar oriented to contact one of the first sheet 12 or second sheet 14 with an opposed pressure bar. The heating wire can be configured to achieve a temperature sufficient to achieve localized melting of the associated thermoplastic material; typically, between about 450° F. and 750° F. in certain applications. In certain applications, the heating apparatus can be configured to provide a graduated temperature application; either higher-to-lower or lower-to-higher. Non-limiting examples of suitable direct contact sealer units are commercially available under the tradename PAC or Verisimo.

It is contemplated that the continuous seam 16 can be produced by exposing the outwardly oriented face of first (upper) sheet 12 flexible polymeric material present in an assembly composed of overlying a second flexible sheet 14 of polymeric material with a heat source such as a pressure band heater at a temperature between 450° F. and 750° F. for an interval sufficient to impart a melting temperature to the outer surface region of the localized region of the outwardly oriented face 11 of the first or upper sheet 12 proximate to the applied heat source and to transmit such imparted heat into the first sheet 12, through to the inwardly oriented face 19 of the second or lower sheet 14 of flexible polymeric material. Without being bound to any theory, it is believed that the heat imparted to the sheet assembly permits the temperature of localized polymer material present in the first sheet 12 to exceed the glass transition temperature of the material proximate to the outwardly oriented face 11 of the first sheet 12. With continued application of heat from the heat source, the polymeric material in the region proximate to the outwardly oriented face 11 of the first sheet 12 experiences a localized drop in temperature from an initial temperature peak as the temperature of the affected polymeric material passes through the temperature of crystallization $T_C$ of the polymeric material. Continued application of heat to this region causes a temperature elevation in the polymeric material proximate to the outwardly oriented surface 11 to melt as the temperature of the polymeric material begins to rise and reaches the melting temperature $T_M$ for the associated polymeric material.

Without being bound to any theory, it is believed that the heat imparted to the polymeric material in the localized region of the outwardly oriented face 11 of the first sheet 12 is transmitted inwardly through to the respective inwardly oriented face 17 of the first sheet 12 and on into the polymeric material in the inwardly oriented face 19 of the second flexible sheet 14. The amount of heat and duration during which the heat is imparted results in a seam 16 that is continuous in transverse direction of the associated bag.

Figure 10:
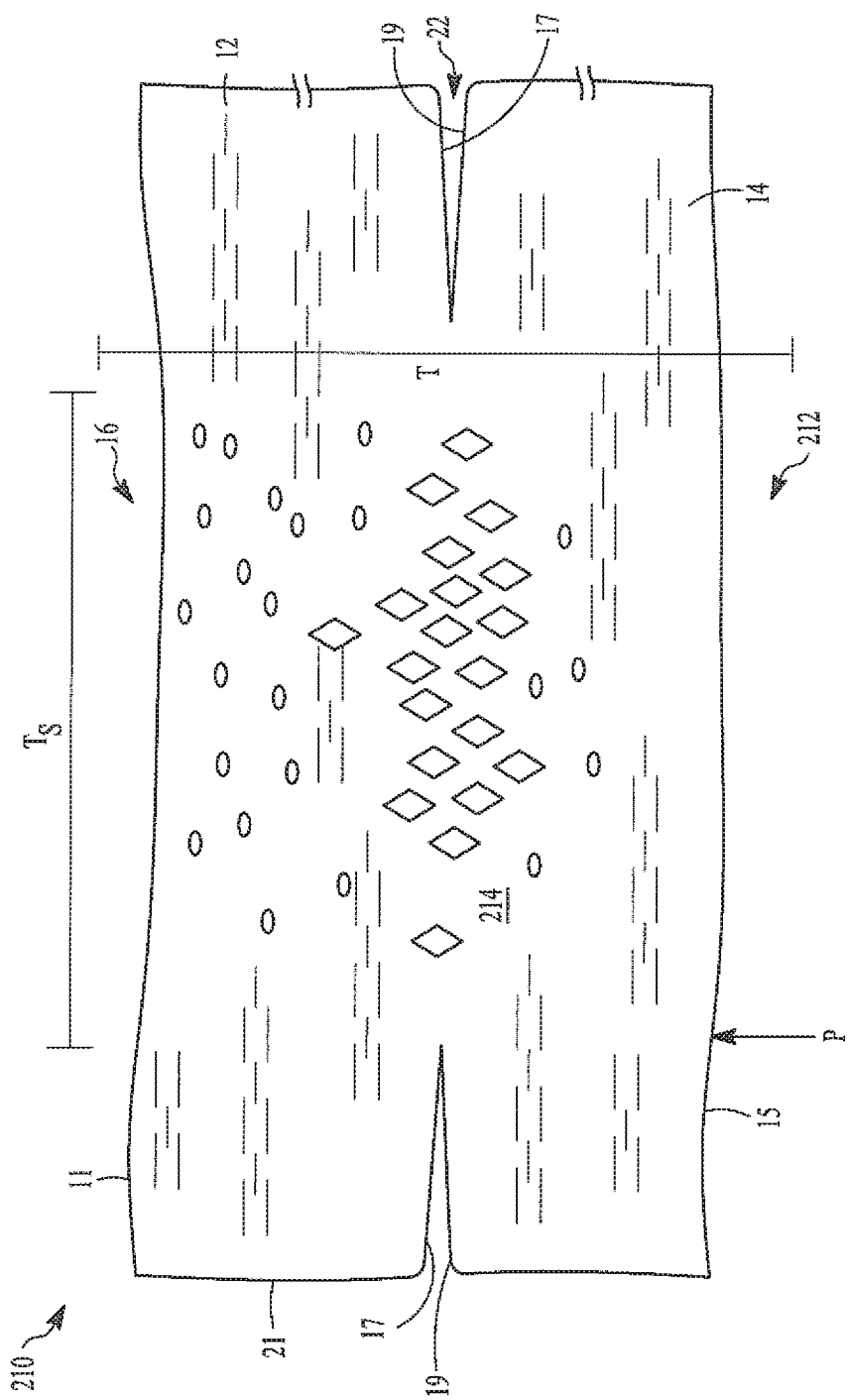
FIG. 10 is a partial enlarged pictorial representation of a cross-section taken across an embodiment of the continuous seam as disclosed herein.

An embodiment of seam 16 as depicted in FIG. 10 has a cross-sectional seam body that includes a first outer seam region 210 that is located proximate to the outwardly oriented face 11 of the first flexible sheet 12. The seam 16 also has a second outer seam region 212 composed of polymeric material that is proximate to the outwardly oriented face 15 of the second flexible sheet 14 that is opposed to the first outer region 212 and an intermediate seam region 214 of polymeric material that is interposed between the first outer seam region 210 and the second outer seam region 212.

The polymeric material that is present in the first outer seam region 210 exhibits polymeric melt characteristics. In FIG. 10, the melted polymeric material region is schematically depicted as a plurality of circles.

The polymeric material present in the in the intermediate seam region 214 exhibits a level of crystallinity that is greater than polymeric material present in the either the first outer seam region 210 or the second outer seam region 212. In FIG. 10, the crystalline region is depicted by a plurality of diamonds.

Where the polymeric material employed in the first and second sheets 12, 14 is oriented; for example has a discernable transverse direction and/or a discernable machined direction, the cross-sectional characteristics of the second outer seam region 212 of the continuous seam 16 will exhibit the transverse and/or machined oriented characteristics essentially similar to the characteristics of the respective polymeric region contiguous to the second outer seam region 212 while the polymeric material in the first outer seam region 210 will exhibit a higher degree of non-oriented or amorphous characteristics. In FIG. 10, the region of oriented polymer is depicted as a series of dashes.

As indicated previously, for additional sealing capability, the fluid sample bag 10 can include two spaced heat seams 16 in the peripheral region inward from the peripheral edges of the first or upper sheet 12 and the second or bottom sheet 14. It is contemplated that the two spaced seams will exhibit similar cross sectional characteristics.

In the embodiment depicted in the various drawing figures, the peripheral region P located proximate to the outer edges of the first and second sheets 12, 14, when in overlying relationship to one another can extend a distance inward. In certain embodiments, the peripheral region P will constitute between 5% and 20% of the elongated surface area of the assembly composed of the first and second sheets. In various embodiments, the container 10 can include a selvage region exterior to the seam 16. However, it is considered within the purview of this disclosure to include a continuous heat seam or seams 16 can that seals the peripheral edges of the upper and bottom sheets 12 and 14 if desired or required. The continuous heat seam 16 will form a hollow, expandable cavity 22 within the interior of the sealed container 10.

The container such as the fluid sample bag may be employed to provide a sealed reservoir of a collected fluid such as a gas. To facilitate gas sampling, a fitting 32, as shown in FIG. 1, and in greater detail in FIGS. 4, 5, and 6, can be mounted within the sealed fluid sample bag 10 in order to control the flow of fluid material such as gas to and from the interior 22 of the sealed sample bag 10, as described in greater detail hereafter.

The fitting 32 includes a body 34 formed of a chemically inert material. Any suitable material, such as a fluorocarbon or fluorinated plastic may be employed. By way of example, fluorocarbons sold under the trademark TEFLON and those sold under trade or chemical names of TFE, PTFE, FEP, PFA and ECTFE, may be employed. Other fluorocarboned plastics sold under the trademarks, FLOUNS, HALON, HALARS and KYNAR. The material employed will be on that provides a structural stability to the associated sample bag 10

Figure 4:
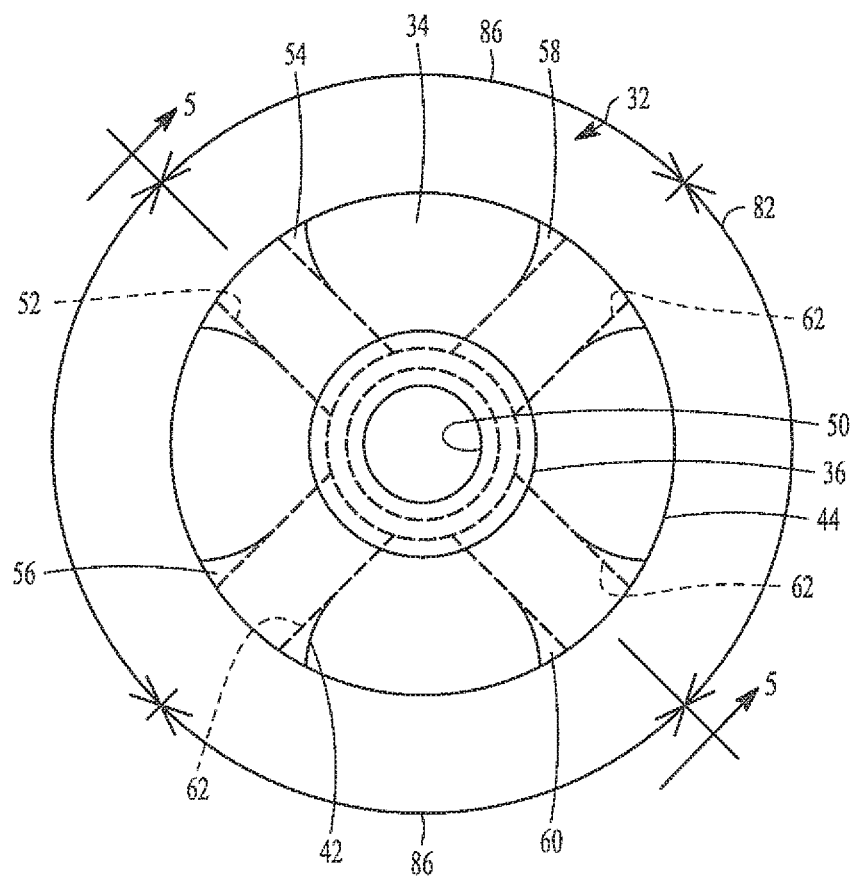
FIG. 4 is an enlarged, plan view of the fitting shown in FIG. 1.

The body 34 of the fitting 32 has a generally circular shape in plan, as shown in FIGS. 1 and 4. The body 32 includes a top portion 36 and an opposed, spaced bottom portion 38, both of generally planar configuration.

The top portion 36 is formed on a boss 40 which extends upward from the main portion of the body 34. The body 34 has a top surface with walls 42 which curve smoothly from the top portion 36 of the boss 40 radially outward to a peripheral edge or rim 44. Similarly, the body 34 includes a bottom surface in which walls 46 curve smoothly radially outward from the bottom portion 38 to the peripheral edge or rim 44. The peripheral edge or rim 44 is thus spaced between the top and bottom portions 36 and 38, respectively.

A bore 50 is centrally located in the top portion 36 of the body 34 and extends through the boss 40 into the interior of the body 34. The bore 50 may be internally threaded. For additional strength, an internally threaded metallic sleeve 52 is mounted within the bore 50 as shown in detail in FIG. 5.

Figure 5:
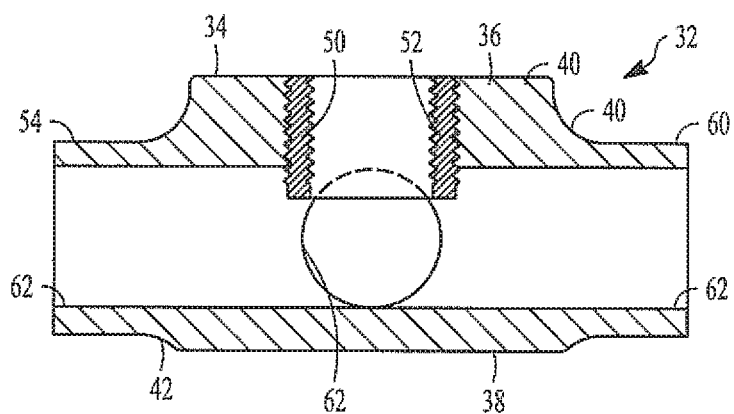
FIG. 5 is a cross sectional view generally taken along line 5-5 in FIG. 4.

A plurality of gas flow ports, such as gas flow ports 54, 56, 58 and 60 comprise bores, such as bore 62, which extend through the body 34 and are connected in fluid flow communication with the central bore 50 in the body 34, as shown in FIGS. 4 and 5. It should be noted that the top and bottom wall surfaces 42 and 46 of the body 34 taper upward a small amount at the peripheral edge 44 of the body 34 at the location of each of the gas flow ports 54, 56, 58, and 60.

Although the fitting 32 may be employed by felt to communicate gas flow into and out of the container 10, as conduit means may be disposed within the sealed container 10 and connected to selected ones of the gas flow ports in the fitting 32 to alternately conduct gas supplied through the fitting 32 into the interior 22 of the sealed container 10 and, also, to provide for withdrawal of gas stored within the interior 22 of the container 10 through the fitting 32 to suitable test equipment, as described hereafter.

In one aspect, the gas conduit means comprises a hollow, flexible tubular member 70, as shown in FIG. 1. By way of example only and not limitation, two gas flow conduits 70 are employed in one embodiment of the present invention. It will be understood that other numbers of gas flow conduits, such as one, three, etc., may also be employed in the sealed container 10 with suitable modification of the fitting 32.

The gas flow tubular member 70 comprises a hollow tubular member preferably formed of a chemically inert material, such as those sold under the trademarks, TEFLON or TEDLAR or a fluoro-copolymer ACLAR. The gas flow conduit 70 is provided with a plurality of spaced apertures 72 formed in the side walls thereof along the length of the conduit 70, between the first and second ends 74 and 76, respectively. The apertures 72 provide a fluid flow path between the hollow interior of the gas flow member 70 and the interior 22 of the sealed container 10.

In one aspect, two separate tubular members 70 and 71 are connected at their respective first and second ends to selected ones of the gas ports in the fitting 32. Thus, the first end 74 of the first gas flow member 70 is connected to the gas flow port 54 in the fitting 32. The second end 76 of the member 70 is connected to the gas flow port 56. Similarly, the first and second ends 78 and 80 of the second gas flow member 71 are respectively connected to the gas flow ports 58 and 60 in the fitting 32. The gas flow ports are thus arranged in associated pairs formed of a first pair of ports 54 and 56 and a second pair of ports 58 and 60. The angular spacing of each of the ports 54, 56, 58, and 60 in the fitting 32 is selected to provide a desired shape and configuration to each of the gas members 70 and 71. As shown in FIG. 4, the angular spacing between the ports in each pair of ports, such as between ports 54 and 56, as shown by reference number 82, is substantially 70°. The same spacing, as shown by reference number 82, is provided between the opposed pair of ports 58 and 60. This provides a spacing of substantially 110°, as shown by reference number 86, between a port of each pair of ports and the adjacent port of the opposite pair of ports, such as between ports 54 and 58 or between ports 56 and 60.

This angular orientation of the gas flow ports 54, 56, 58, and 60 in the fitting 32 provides the elongated, substantially tear-drop shape for the gas members 70 and 71, as shown in FIG. 1. In this manner, the gas conduits 70 and 71 fill a substantially large portion of the interior 22 of the sealed container 10 so as to enable the interior 22 of the said container 10 to be completely filled with gas emissions supplied through the fitting 32 as well as to enable such stored gas emissions to be completely withdrawn from all portions of the sealed container 10.

Figure 6:
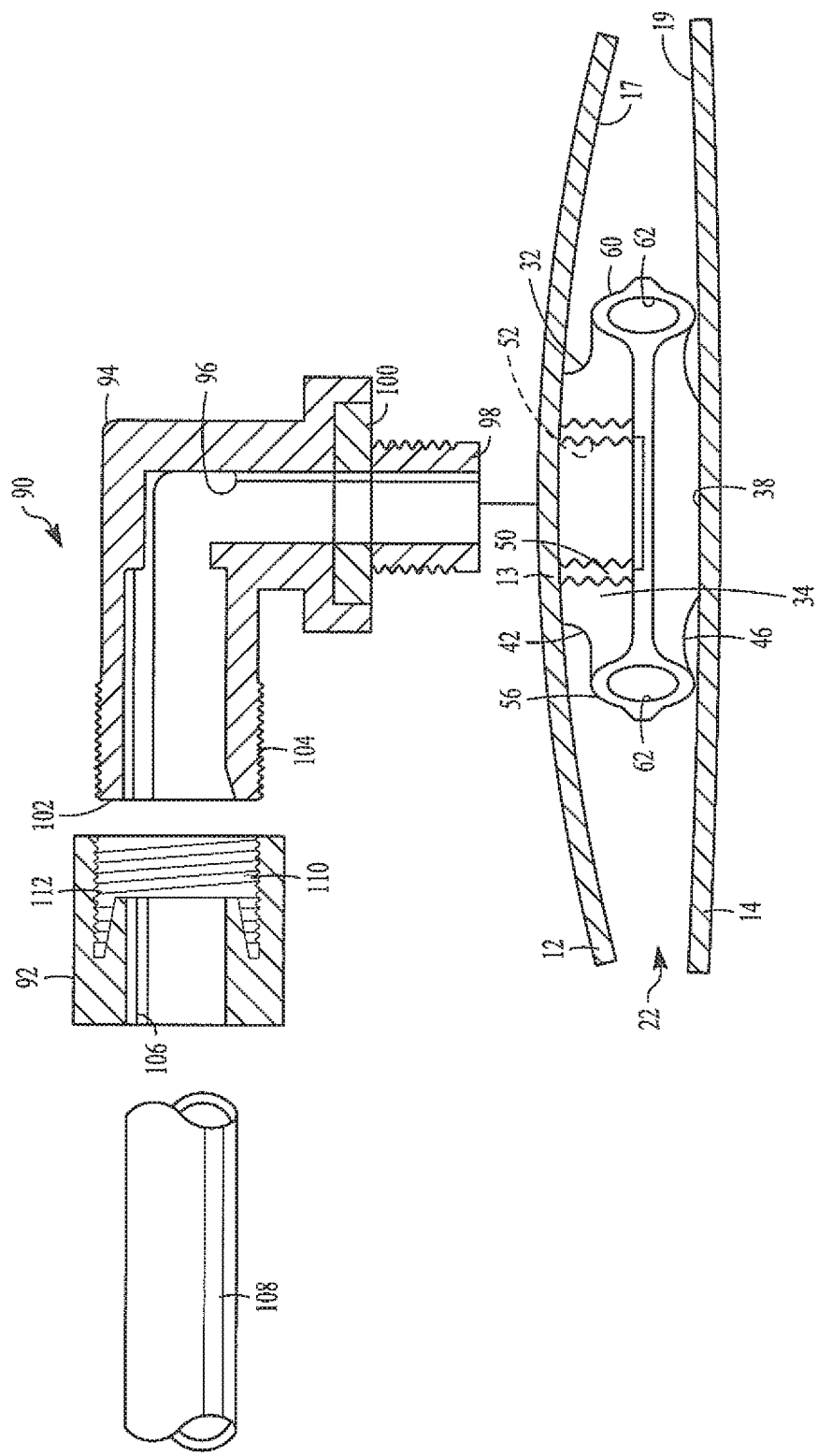
FIG. 6 is a partial, exploded, front elevational view showing the mounting of the fitting within the sealed container and the attachment of the coupling to the fitting.

The fitting 32 is connected to the source of gas emissions and/or emission test apparatus by means of a coupling denoted generally by reference number 90 in FIGS. 1 and 6. The coupling 90 preferably comprises a nut 92 and a hollow body 94. The body 94 is shown as having a generally elbow shape; although a straight shape for the body 94 may also be provided. The body 94 includes a hollow interior bore 96 which extends between opposed ends of the body 94. The first end 98 of the body 94 is provided with a plurality of external threads which are threadingly engageable with the threads in the insert 52 mounted in the central bore 50 in the fitting 32 to attach the body 94 to the fitting 32. A seal means, such as an O-ring 100, is mounted in a recess at the end of the threaded first end portion 98 of the body 94 for sealingly contacting the upper sheet 12 of the sealed container 10 to sealingly connect the body 94 to the sealed container 10 and to sealingly close the aperture 13 in the top sheet 12 of the container 10. The second end 102 of the body 94 is also provided with a plurality of external threads 104.

The nut 92 includes a central, through bore 106 which is adapted to slidingly receive one end of a hollow conduit or tube 108. The conduit 108 is attached at an opposite end to the test equipment for the supply of gas emissions to the apparatus of the present invention and/or to connect such stored gas emissions to test equipment for analysis. The nut 92 may be any conventional nut, such as one disclosed in U.S. Pat. No. 3,977,708 and manufactured by Fluoroware, Inc. The contents of this patent are incorporated herein by reference with respect to the construction of the nut 92.

As shown in FIG. 6, the nut 92 includes a plurality of internal threads 110 which threadingly engage the external threads 104 on the second end 102 of the body 94. Further, the nut 92 includes an internal, elongated, relatively thin sleeve 112. The side walls of the sleeve 112 taper inwardly from one end to a terminal end and are spaced from the opposed threads 110. This arrangement captures the end of the conduit 108 as the nut 92 is threaded onto the second end 102 of the body 94 to sealingly connect the conduit 108 to the body 94.

In use, the sealed container 10 is initially completely evacuated of any contents such that the top and bottom sheets 12 and 14 are substantially in registry and conform to the smoothly curved wall surfaces 42 and 46 on the fitting 32 and about the gas flow tubular members 70 and 71. The gas conduit 108, shown in FIG. 6, is connected to a suitable source of gas emissions, such as the engine of a motor vehicle under test. The other end of the conduit 108 is connected to the body 94 after the body 94 has been sealingly threaded to the fitting 32 into sealed engagement with the top sheet 12 adjacent the aperture 13 in the top surface of the top sheet 12.

Then, gas emissions from the motor vehicle or gas from the ambient atmosphere are supplied through the conduit 108, the body 94 and the fitting 32 into the hollow gas members 70 and 71 and then to the interior 22 of the sealed container 10. The sealed container 10 inflates to a constant volume and, due to the sealed nature of the container 10, retains the gas emissions for a predetermined amount of time.

Subsequently, when it is desired to analyze the contents of the gas stored within the sealed container 10, such gaseous contents are evacuated from the sealed container 10 through the apertures 72 in the gas flow members 70 and 71, the fitting 32, the body 94 and the conduit 108 to suitable test equipment.

Figure 8:
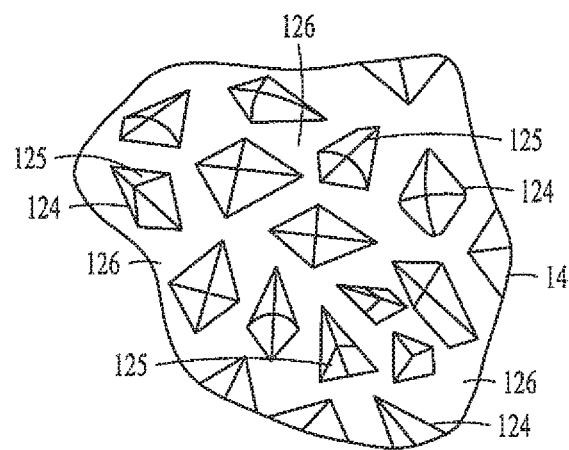
FIG. 8 is a partial, enlarged pictorial representation of one embodiment of the projections formed on one sheet of the container of the present invention.
Figure 9:
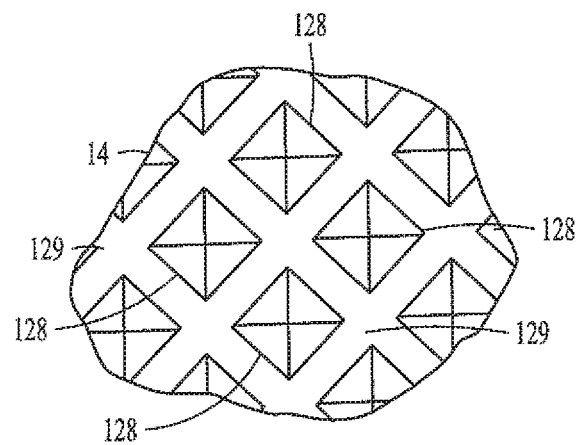
FIG. 9 is a partial, enlarged pictorial representation of a different arrangement of projections on one sheet of the container of the present invention.

In another aspect, at least one of the sheets, such as the bottom sheet 14 of the container 10, includes a plurality of spaced, discrete projection 124, as shown in FIG. 8. The projection 124 extend outward from one surface of the bottom sheet 14 toward the opposed top sheet 12 in the interior cavity 22 of the sealed container 10. The projection 24 may have irregular shapes and may be disposed at irregular spacings as shown in FIG. 9. The projections 124 may be formed on substantially the entire surface of the bottom sheet 14.

The projection 124 are formed in the bottom sheet 14 by any suitable means, such as the use of rolls or a press which permanently deforms the bottom sheet 14 into the desired projection shape and location. As shown in FIGS. 8 and 9, the projection 124 generally taper from the surface of the bottom sheet 14 to an apex 125. It will be understood that projection 124 having any other shape may also be employed.

As shown in FIG. 8, a plurality of gas flow paths 126 are formed between the spaced, adjacent projections 124. The gas flow paths 126 extend over the entire surface of the sheet 14 and remain even when the container 10 is evacuated and the opposed sheet 12 is drawn into close registry or contact with the sheet 14. The gas flow paths 126 thus insure a complete filling of the container 10 when gas is introduced into the interior cavity 22 of the container 10 through a fitting 32 as well as a complete evacuation of the entire volume of gas from the container 10 through the fitting 32.

Figure 3:
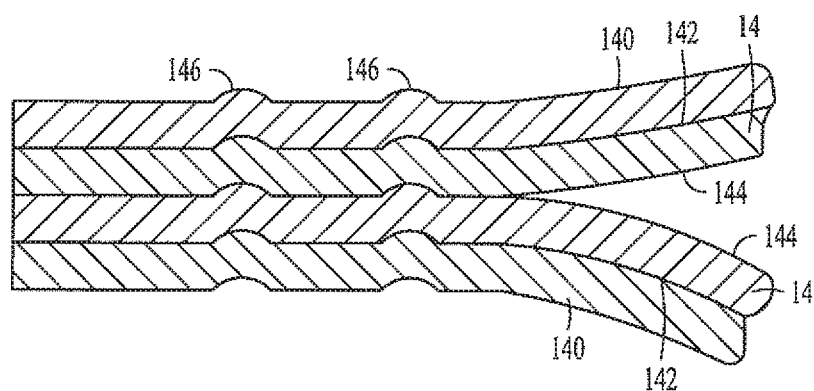
FIG. 3 is a cross sectional view, generally similar to FIG. 2, but showing an alternate embodiment of the sealed gas emission sample container.

The sealed container 10, in one aspect, is formed of first and second pairs of flexible sheets, with each pair of sheets forming one panel or sidewall of the container 10. In the aspect shown in FIG. 3, each of the first and second pairs of sheets is formed of a first fluoro-copolymer sheet 14 and a second flexible vinyl sheet 140. By example only, the first sheet 14 is one to two mils in thickness and the second sheet 140 is 3 mils in thickness. In this aspect, the first sheet 14 has one surface 142 treated for receiving an adhesive, not shown, to join the first sheet 14 to the second sheet 140. The opposite surface 144 of the first sheet 14 is strippable or heat sealable.

In constructing the container 10 from sheets having multiple layers, the first and second pairs of sheets are inverted from each other such that the first sheets 14 of each first and second pairs of sheets are facing each other. This places the strippable or heat sealable surfaces 144 of each of the first sheets 14 in registry with each other so as to enable a heat seal 146 to be formed around the complete outer periphery of the layers 14 to form a sealed interior chamber within the container 10.

Figure 7:
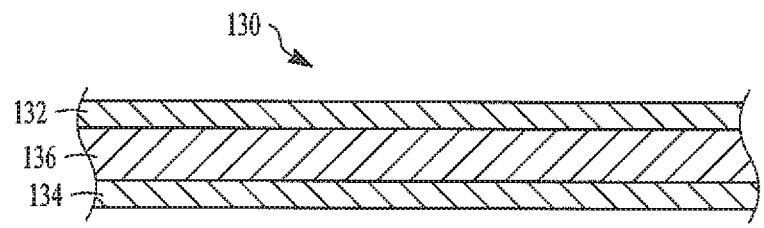
FIG. 7 is a cross sectional view of a detail of one embodiment of the sheet material employed in the stand-alone sealed gas emission sample container of FIG. 1.

FIG. 7 depicts a sheet assembly 130 which is formed of a pair of outer sheets of a fluoro-polymer, such as ACLAR to provide a non-porous, moisture or fluid-proof barrier to one or more intermediate sheets in FIG. 7 by way of example. The sheets 132, 134, and 136 are laminated or otherwise fixed together into a unitary single sheet structure.

The layers 132, 134, and 136 may be provided in any thickness to provide the desired strength, flexibility or other characteristics of the overall sheet 130. By way of example, the outer sheets 132 and 134 can have a 0.5 mil thickness; while the at least one intermediate sheet 136 may have a thickness of 1.0 mils or greater. In certain embodiments, the total sheet thickness can be greater than 2 mils with thicknesses of 3 mils or 4 mils being possible in certain applications. Similarly, where the flexible sheet is composed of single layer material, the thickness can be greater than 2 mils, with thicknesses greater than 3 mils begin possible in certain applications.

In certain embodiments the fluoropolymer employed can be prepared by a process that includes the step of contacting in a first reaction zone an initiator, 2,3,3,3-tetrafluoro-1-propene ($CF_3CF=CH_2$), and optionally, at least one first ethylenically unsaturated comonomer capable of copolymerizing therewith, wherein said contacting is carried out at a first temperature, pressure and length of time sufficient to produce said fluoroolefin polymer; and an acrylic polymer prepared by a process, comprising the step of contacting in a second reaction zone an initiator, at least one acrylic monomer selected from the group consisting of: acrylic acid, methacrylic acid, acrylate ester, methacrylate ester, and a mixture thereof, and optionally, at least one second ethylenically unsaturated comonomer capable of copolymerizing therewith, wherein said contacting is carried out at a second temperature, pressure and length of time sufficient to produce said acrylic polymer. Where desired or required, the fluoroolefin polymer is selected from the group consisting of: a 2,3,3,3-tetrafluoro-1-propene homopolymer, copolymer, terpolymer, and a mixture thereof; and wherein said acrylic polymer is selected from the group consisting of: an acrylic homopolymer, copolymer, terpolymer, and a mixture thereof. The fluoroolefin can be 2,3,3,3-tetrafluoro-1-propene copolymer. The first and said second reaction zone can further comprise a solvent selected from the group consisting of: esters, ketones, ethers, aliphatic hydrocarbons, aromatic hydrocarbons, chlorinated hydrocarbons, ethyl acetate, butylacetate, 1-methoxy-2-propanol acetate, toluene, xylene, methyl ethyl ketone, 2-heptanone, and 1,1,1-tri-chloroethane, and mixtures thereof. The 2,3,3,3-tetrafluoro-1-propene can be present in the fluoropolymer from about 20 wt. % to about 100 wt. % of the total weight of the polymeric material with the fluoropolymer being present from about 70 wt. % to about 100 wt. % in certain embodiments.

It is within the purview of this disclosure that the device is a gas storage container for receiving, storing and discharging gas that includes first and second separate sheets disposed in overlapping relationship with each other that are formed of a fluoro-copolymer ACLAR film; and a heat seam formed completely about the peripheral edges of overlapping first and second sheets to form a hollow, expandable, sealed chamber between the innermost, non-sealed portions of the first and second sheets. This container can further include a gas flow fitting, sealingly mounted on and extending through aligned apertures in one of the first and second sheets and disposed within the innermost, non-sealed portions of the first and second sheets. It can also include a gas flow conduit, disposed within the innermost, non-sealed portions of the first and second sheets, and fluid flow coupled to the fitting to distribute gas between the innermost, non-sealed portions of the first and second sheets and the fitting.

The addition to the first and second separate sheets disposed in overlapping relationship with each other that are formed of a fluoro-copolymer ACLAR film; and a heat seam formed completely about the peripheral edges of overlapping first and second sheets to form a hollow, expandable, sealed chamber between the innermost, non-sealed portions of the first and second sheets, the gas storage container for receiving, storing and discharging gas can include at least one fluoropolymeric sheet in which at least one layer on the fluoropolymeric sheet has a second surface of the first sheet of each of the first and second panels that is capable of heat seaming to another one of the first and second sheets. Where desired or required, the second surfaces of the first sheets of each of the first and second panels are disposed facing each other; and the second sheets are disposed outermost of the first sheets in each of the first and second panels.

In certain embodiments, at least one of the first and second sheets have a plurality of discrete, spaced projections formed therein, the projections extending outward from one major surface of the at least one sheet toward the other of the first and second sheets when the first and second sheets are joined together, with gas flow paths formed between adjacent projections over substantially the entire surface of the at least one sheet. Where desired or required, the projections are irregularly shaped and irregularly spaced over the at least one sheet. In certain embodiments, the projections are identically shaped and spaced at an identical distance over the at least one sheet. Both the first and second sheets can have a plurality of discrete, spaced projections formed therein with the projections facing projections on the other sheet when the first and second sheets are joined together.

Also disclosed is a non-porous, non-moisture permeable sheet that includes first and second outer disposed sheets formed of a fluoro-copolymer ACLAR or PFX14-13 and at least one non-fluoro-copolymer layer disposed intermediately between the first and second outer disposed sheets; and the first and second outer disposed sheets and the at least one intermediate sheet are laminated together in a unitary single sheet.

It is also within the purview of the present disclosure, that the device disclosed herein can be a standalone gas emission sample container for receiving, storing and discharging a constant volume of gas emissions. The gas emission sample container can include first and second pairs of flexible plastic sheets with each of the first and second pairs of sheets being formed of at least first and second separate sheets disposed in edge-overlapping relationship with each other. The first and second pairs of sheets are sealingly joined along the entire peripheral edges of the first and second pair of sheets to form a hollow expandable, sealed cavity of a predetermined constant volume between the inner most facing sheets of the first and second pairs of sheets with one of the first and second sheets of the first and second pairs of sheets being formed of a gas impervious, chemically inert, fluoro-copolymer film.

Where desired or required, the all of the at least first and second sheets of the first and second pairs of sheets in the stand-alone gas emission sample container are formed of an identical material.

Where desired or required, the stand-alone gas emission sample container can include first and second spaced heat seams, each extending completely around the peripheral edges of the first and second pairs of sheets.

Where desired or required, the stand-alone gas emission sample container can include aligned apertures formed in a predetermined position in the first and second sheets of one of the first and second pairs of sheets; and a gas flow fitting, sealingly mounted on and extending through the aligned aperture in the one of the first and second pairs of sheets into fluid flow communication with the hollow cavity, for forming a gas flow path to the hollow cavity to store a constant volume of gas emissions in the hollow cavity and for discharging the constant volume of gas emission from the hollow cavity.

As disclosed herein, the stand-alone gas emission sample container is one in which the second surface of the first sheet of each of the first and second panels is capable of heat seaming to another one of the first and second sheets which in certain embodiments, the second surfaces of the first sheets of each of the first and second panels are disposed facing each other; and the second sheets are disposed outermost of the first sheets in each of the first and second panels.

Also disclosed herein there is disclosed a stand-alone gas emission sample container that includes first and second pairs of flexible plastic sheets, each of the first and second pairs of sheets being formed of at least first and second separate sheets disposed in edge-overlapping relationship with each other, with the first and second pairs of sheets sealingly joined along the entire peripheral edges of the first and second pair of sheets to form a hollow expandable, sealed cavity of a predetermined constant volume between the inner most facing sheets of the first and second pairs of sheets; and one of the first and second sheets of the first and second pairs of sheets being formed of a gas impervious, chemically inert, fluoro-copolymer film in which the second surface of the first sheet of each of the first and second panels is capable of heat seaming to another one of the first and second sheets.

In certain embodiments, on the aforementioned stand-alone gas emission container, the second surfaces of the first sheets of each of the first and second panels are disposed facing each other; and the second sheets are disposed outermost of the first sheets in each of the first and second panels. In certain embodiments, this stand-alone gas emission container includes a heat seam is formed in the peripheral edges of the second surfaces of the first sheets of the first and second panels. In other embodiments, stand-alone gas emission container has second sheets that are disposed facing each other; and the first sheets are disposed outermost of the second sheets. In certain embodiments, the stand-alone gas emission can include a heat seam that is formed in the peripheral edges of opposed surfaces of the second sheets of the first and second panels.

Also disclosed herein is a stand-alone gas emission sample container that includes first and second pairs of flexible plastic sheets, each of the first and second pairs of sheets being formed of at least first and second separate sheets disposed in edge-overlapping relationship with each other, with the first and second pairs of sheets sealingly joined along the entire peripheral edges of the first and second pair of sheets to form a hollow expandable, sealed cavity of a predetermined constant volume between the inner most facing sheets of the first and second pairs of sheets; and one of the first and second sheets of the first and second pairs of sheets being formed of a gas impervious, chemically inert, fluoro-copolymer film in which the second surface of the first sheet of each of the first and second panels is capable of heat seaming to another one of the first and second sheets in which the first sheet has both first and second surfaces treated to receive an adhesive and is non-heat seamable; and the first sheets are disposed outermost of the second sheets in each of the first and second panels. In certain embodiments, the stand-alone gas emission container includes a heat seam formed in the peripheral edges of opposed surfaces of the second sheets of the first and second panels.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A fluid sample bag, comprising:
a first sheet of flexible polymeric material, the polymeric material having a transverse direction and a machined direction, the first sheet having an outer peripheral region, an inwardly oriented face and an outwardly oriented face;
a second sheet of flexible polymeric material, the polymeric material having a transverse direction and a machined direction, the second sheet having an outer peripheral region, an inwardly oriented face and an outwardly oriented face;
a continuous seam located in the outer peripheral regions of the respective first and second sheets of flexible polymeric material, the continuous seam contiguously interposed between the inwardly oriented face of the first sheet of flexible polymeric material and the inwardly oriented face of the second sheet of flexible polymeric material and composed of melted polymeric material derived from the first and second sheets; and
an outer selvage located in the outer peripheral regions exterior to the continuous seam,
wherein the first sheet, the second sheet and the continuous seam define a hollow expandable interior sealed chamber between the respective inwardly oriented faces of the first and second sheets, wherein the polymeric material of the first sheet and the second sheet is a polymeric material that includes at least one fluoropolymer, the fluoropolymer having a specific gravity between 1.9 and 2.2, a modulus secant in a transverse direction between 1000 MPa and 1400 MPa and a water vapor transmission rate less than 0.4 gms/m$^2$/day.

2. The fluid sample bag of claim 1, wherein the continuous seam has a cross-sectional body, the cross-sectional body comprising:
a first outer region proximate to the outwardly oriented face of the first sheet;
a second outer region proximate to the outwardly oriented face of the second sheet and opposed to the first outer region; and
an intermediate region interposed between the first outer region and the second outer region,
wherein polymeric material present in the first outer region exhibits characteristics of melted polymeric material, wherein polymeric material present in the intermediate region exhibits elevated crystallinity and the second outer region exhibits the transverse direction and the machined direction of the polymeric material proximate in the second sheet.

3. The fluid sample bag of claim 1, further comprising a fluid flow fitting, configured to sealingly communicate with a coupling, in a use position, the coupling extending through an aligned aperture defined in one of the first sheet or the second, the fluid flow fitting disposed within the hollow expandable interior sealed chamber.

4. The fluid sample bag of claim 3, further comprising a fluid flow conduit, disposed within the hollow expandable interior sealed chamber, the fluid flow conduit coupled to the fluid flow fitting to distribute introduced fluid between the hollow expandable interior sealed chamber and the fitting.

5. The fluid sample bag of claim 3, wherein a thickness of each of the first and second sheets is between 1 mil and 4 mil and wherein the seam has a surface thickness $T_s$ between 2 mil and 100 mil.

6. The fluid sample bag of claim 5, wherein at least one of the first sheet or the second sheet are monolayer.

7. The fluid sample bag of claim 1, wherein the fluid sample bag has a width W and the continuous seam has a width Ws wherein W has a value and Ws has a value and wherein $W_s$ is between 0.001% and 1% of W.

8. A stand-alone gas emission sample container for receiving, storing and discharging a constant volume of gas emissions, the stand-alone gas emission sample container comprising:
a first sheet of flexible polymeric material, the polymeric material having a transverse direction and a machined direction, the first sheet having an outer peripheral region and an inwardly oriented face and an outwardly oriented face;
a second sheet of flexible polymeric material, the polymeric material having a transverse direction and a machined direction, the second sheet having an outer peripheral region, the second sheet having an inwardly oriented face and an outwardly oriented face;
a continuous seam located in the outer peripheral region, the continuous seam contiguously interposed between the inwardly oriented face of the first sheet of flexible polymeric material and the inwardly oriented face of the second sheet of flexible polymeric material and composed of melted polymeric material derived from the first and second sheets, wherein the continuous seam has a cross-sectional body, the cross-sectional body comprising:
a first outer region proximate to the outwardly oriented face of the first sheet;
a second outer region proximate to the outwardly oriented face of the second sheet and opposed to the first outer region;
an intermediate region interposed between the first outer region and the second outer region; and
an outer selvage located in the outer peripheral region exterior to the continuous seam,
wherein the first sheet, the second sheet and the continuous seam define a hollow expandable interior sealed chamber between the respective inwardly oriented faces of the first and second sheets and wherein the polymeric material in at least one of the first sheet or the second sheet is a fluoropolymer having a specific gravity between 1.9 and 2.2, a modulus secant in a transverse direction between 1000 MPa and 1400 MPa and a water vapor transmission rate less than 0.4 gms/m$^2$/day.

9. The stand-alone gas emission sample container of claim 8, further comprising:
an aperture formed in a predetermined position in one of the first sheet or the second sheet; and
a gas flow fitting, sealingly mounted on and extending through the aperture in the one of the first sheet or the second sheet into fluid flow communication with the hollow expandable interior sealed chamber, for forming a gas flow path to the hollow expandable interior sealed chamber to store a constant volume of gas emissions in the hollow expandable interior sealed chamber and for discharging the constant volume of gas emission from the hollow expandable interior sealed chamber.

10. The stand-alone gas emission sample container of claim 8, further comprising:
   aligned apertures formed in a predetermined position in one of the first sheet or the second sheet; and
   a gas flow fitting, sealingly mounted on and extending through the aligned apertures in the one of the first sheet or the second sheet into fluid flow communication with the hollow expandable interior sealed chamber, for forming a gas flow path to the hollow expandable interior sealed chamber to store a constant volume of gas emissions in the hollow cavity and for discharging the constant volume of gas emission from the hollow expandable interior sealed chamber.

11. The stand-alone gas emission sample container of claim 8, wherein the polymeric material in the inwardly oriented faces of the first and second sheets are capable of heat seaming to one another.

\* \* \* \* \*